United States Patent
Arthur et al.

(10) Patent No.: US 10,930,972 B2
(45) Date of Patent: Feb. 23, 2021

(54) METAL-PHOSPHOROUS SULFIDE ADDITIVES FOR SOLID STATE BATTERIES

(71) Applicant: Toyota Motor Engineering & Manufacturing North America, Inc., Plano, TX (US)

(72) Inventors: Timothy S. Arthur, Ann Arbor, MI (US); Tomoya Matsunaga, Shizuoka (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 103 days.

(21) Appl. No.: 16/258,210

(22) Filed: Jan. 25, 2019

(65) Prior Publication Data

US 2020/0243899 A1    Jul. 30, 2020

(51) Int. Cl.
*H01M 10/00* (2006.01)
*H01M 10/0562* (2010.01)
(Continued)

(52) U.S. Cl.
CPC ......... *H01M 10/0562* (2013.01); *C01B 25/14* (2013.01); *H01M 4/131* (2013.01);
(Continued)

(58) Field of Classification Search
CPC .. H01M 4/366; H01M 10/0525; H01M 4/525; H01M 4/1391; H01M 4/0471; H01M 4/0402
See application file for complete search history.

(56) References Cited

U.S. PATENT DOCUMENTS 8,652,692 B2   2/2014  Visco et al.
8,980,485 B2   3/2015  Lanning et al.
(Continued)

FOREIGN PATENT DOCUMENTS

KR   10-2018-0025581 A   3/2018

*Primary Examiner* — Cynthia H Kelly
*Assistant Examiner* — Monique M Wills
(74) *Attorney, Agent, or Firm* — Oblon, McClelland, Maier & Neustadt, L.L.P.

(57) ABSTRACT

A composite material of formula (I) is provided:

$$(LPS)_a(MPS)_b \qquad (I)$$

wherein each of a and b is a mass % value from 1% to 99% such that a+b is 100%; (LPS) is a material selected from the group consisting of $Li_3PS_4$, $Li_7P_3S_{11}$, $Li_{10}GeP_2S_{11}$, and a material of formula (II):

$$xLi_2S.yP_2S_5.(100-x-y)LiX \qquad (II)$$

wherein X is I, Cl or Br, each of x and y is a mass % value of from 33.3% to 50% such that x+y is from 75% to 100% and the total mass % of $Li_2S$, $P_2S_5$ and LiX is 100%; and (MPS) is a material of formula (III):

$$mLi_2S.nMS.oP_2S_5.(100-m-n-o)LiX \qquad (III)$$

wherein MS is a transition metal sulfide or a semi metal sulfide, X is I, Cl or Br, each of m, n and o is a mass % value greater than 0 such that (m+n+o) is from 75% to 100% and the total mass % of $Li_2S$, $P_2S_5$ and LiX is 100%. Solid state batteries containing the composite material are also provided.

12 Claims, 8 Drawing Sheets

(51) Int. Cl.
*H01M 10/0525* (2010.01)
*C01B 25/14* (2006.01)
*H01M 4/40* (2006.01)
*H01M 4/136* (2010.01)
*H01M 4/134* (2010.01)
*H01M 4/131* (2010.01)
H01M 4/02 (2006.01)

(52) U.S. Cl.
CPC ........... *H01M 4/134* (2013.01); *H01M 4/136* (2013.01); *H01M 4/405* (2013.01); *H01M 10/0525* (2013.01); *C01P 2002/85* (2013.01); *C01P 2004/03* (2013.01); *H01M 2004/021* (2013.01); *H01M 2300/008* (2013.01)

(56) References Cited

U.S. PATENT DOCUMENTS

| | | | |
|---|---|---|---|
| 2006/0078790 | A1 | 4/2006 | Nimon et al. |
| 2016/0254529 | A1* | 9/2016 | Nagata .................. H01M 4/364 429/231.95 |
| 2017/0250403 | A1* | 8/2017 | Iwasaki ............... H01M 4/0471 |
| 2018/0241042 | A1 | 8/2018 | Cho et al. |
| 2018/0248221 | A1 | 8/2018 | Wang et al. |
| 2018/0309109 | A1 | 10/2018 | Kim et al. |

* cited by examiner

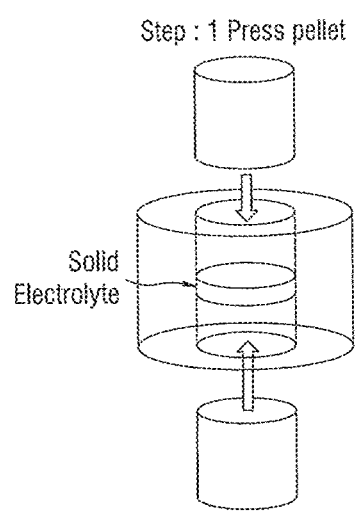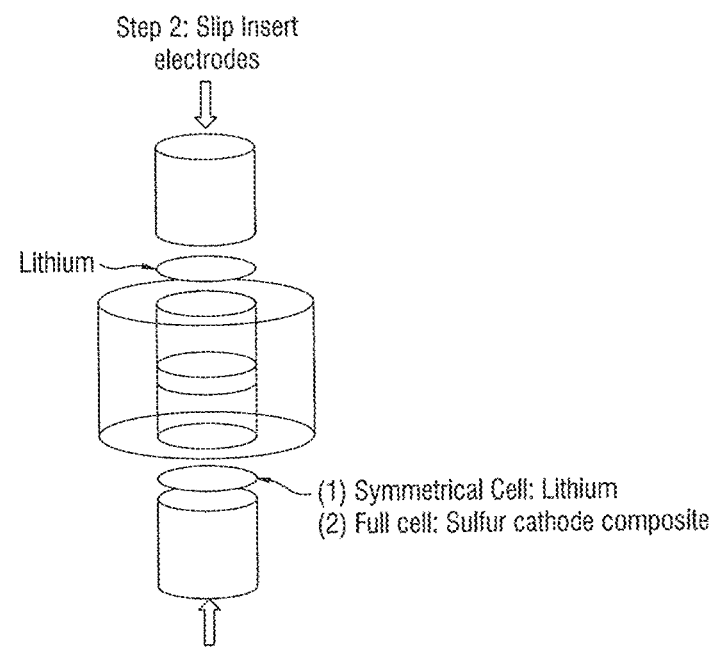
FIG. 1A
FIG. 1B

METAL-PHOSPHOROUS SULFIDE ADDITIVES FOR SOLID STATE BATTERIES

FIELD OF THE DISCLOSURE

This disclosure is directed to a solid-state lithium battery having a lithium metal or lithium alloy anode and a solid-state electrolyte having an additive electrolyte conductive layer between the lithium anode and the solid state electrolyte which essentially acts as a solid electrolyte interphase (SEI) to prevent dendrite shorting and promote increased cycling stability.

BACKGROUND

The Li-ion battery has become an integral part of society, which has enabled the revolution of portable electronic devices, notably cell phones and laptops. Continuing advance in the technology is directed to the integration of batteries into the transportation and grid storage industries, further extending the value of battery technology to modern society. State-of-the-art Li-ion cells have utilized a liquid electrolyte consisting of lithium hexafluorophosphate salt dissolved in carbonate-based organic solvents. However, due to safety and environmental concerns inorganic solid electrolytes are targeted as an alternative to liquid electrolytes—which are flammable and present environmental issues.

Replacing the flammable organic liquid electrolyte with a solid. Li-ion conductive phase would alleviate this safety issue, and may provide additional advantages such as improved mechanical and thermal stability. A primary function of the solid conductive phase, usually called solid Li-ion conductor or solid-state electrolyte, is to conduct $Li^+$ ions from the anode side to the cathode side of the battery during discharge and from the cathode side to the anode side during battery charge while blocking the direct transport of electrons between electrodes within the battery.

Lithium batteries constructed with nonaqueous electrolytes suffer due to the formation of dendritic lithium metal structures which may eventually project from the anode to the cathode over repeated discharge and charge cycles. When a dendrite projects to the cathode an electrical short is formed and the battery energy is rapidly released to the effect that the organic solvent of the nonaqueous electrolyte may ignite.

Therefore, there is much interest and effort focused on the discovery of solid Li-ion conducting materials and structures which would lead to an solid-state lithium battery. Lithium metal is a promising anode active material for solid-state batteries. Batteries using a lithium metal negative electrode are of greatest interest in battery research and development because lithium metal has an extremely high specific capacity of 3,860 mAh/g and a low reduction potential of −3.04 V vs the standard hydrogen electrode. However, due to such low reduction potential, most materials are reduced when they are exposed to lithium metal. For instance, when exposed to air (i.e. $H_2O$, $CO_2$, $N_2$ and O2) lithium metal is immediately compromised by a layer of lithium salts on the surface, such as $Li_2CO_3$, $Li_3N$, LiOH and. Formation of these salts inactivates the lithium metal surface of the anode. Further, lithium metal exposed to liquid electrolytes (e.g. carbonates) form layers containing a mixture of organic and inorganic species. Solid electrolytes are little better and most react with lithium to form salts comprised of lithium and the other elements that make up the solid electrolyte.

Thus, the formation of lithium dendrites remains an issue to be overcome to develop commercially viable solid-state batteries. Dendrites can penetrate solid-electrolytes, as shown by E. J. Cheng, A. Sharafi, J. Sakamoto, Electrochim. Acta., 85-91, (2017) and Tsai et al. ACS Appl. Mater. Interfaces, 10617-10626, (2016). To realize all solid-state lithium sulfur batteries, finding a structure or chemistry which prevents the propagation of lithium dendrites is necessary.

Ionically conducting oxides such as LISICON ($Li_{14}ZnGe_4O_{16}$), NASICON($Li_{1.3}Al_{0.3}Ti_{1.7}(PO_4)_3$), perovskite (for example, $La_{0.5}Li_{0.5}TiO_3$), garnet ($Li_7La_3Zr_2O_{12}$), LiPON (e.g. $Li_{2.88}PO_{3.73}N_{0.14}$) and sulfides, such as $Li_3PS_4$, $Li_7P_3S_{11}$ and LGPS ($Li_{10}GeP_2S_{12}$) have been studied as solid-state lithium electrolytes.

Lithium thiophosphate solid electrolytes in contact with lithium decompose into $Li_2S$ and $Li_3P$ [R Garcia-Mendez, F Mizuno, R Zhang, T S Arthur, J Sakatnoto, Electrochimica Acta, vol 237, pg. 144-151 (2017)]. When in contact with Li metal, phosphorous within lithium thiophosphates are reduced as follows (J. Mater. Chem. A, 2016, 4, 3253-3266).

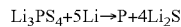

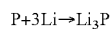

As exemplified, solid Li-ion conductors suffer a stability issue when in direct contact with a Li metal anode. In each of these cases, the non-uniformity of the decomposition products and, in many cases, highly resistive nature of many such products result in a non-uniform current distribution across the lithium electrode surface during lithium deposition, which leads to uneven plating and dendrite formation.

Sulfur is very attractive as a positive electrode active material for a solid-state battery because it is very cheap and has a high specific capacity of 1,672 mAh/g. To be commercially viable lithium sulfur battery technology must also overcome several major challenges related to a sulfur cathode, most notably the dissolution of lithium polysulfides into the electrolyte during the reduction of sulfur and the dendritic growth of lithium during charging. [P. Bonnick, E. Nagai and J. Muldoon, J. Electrochem. Soc., vol 165, issue 1, A6005-A6007 (2018)] Most researchers who have explored lithium-sulfur all solid state battery have used a lithium alloy negative electrode with a sufficiently high reduction potential to avoid the decomposition of the solid electrolyte. One example described is lithium-indium. [T. Ijakari, A. Hayni, M. Tasumisago, Adv. Sustainable Syst., 1700017 (2017)] Unfortunately, using a higher reduction potential negative electrode decreases the voltage and energy of the battery.

Of the solid electrolyte systems being investigated, lithium thiophosphates tend to provide better ionic conductivity and malleability. The structural characteristics of effective $Li^+$ conducting crystal lattices have been described by Ceder et al. (Nature Materials, 14, 2015, 1026-1031) in regard to known $Li^+$ ion conductors $Li_{10}GeP_2S_{12}$ and $Li_7P_3S_{11}$, where the sulfur sublattice of both materials was shown to very closely match a bcc lattice structure. Further, $Li^-$ ion hopping across adjacent tetrahedral coordinated $Li^+$ lattice sites was indicated to offer a path of lowest activation energy. The most notable examples of lithium thiophosphate solid electrolytes include $Li_3PS_4$, $Li_7P_3S_{11}$ and $Li_{10}GeP_2S_{11}$.

Due to good thermal stability solid-state electrolytes are advantageous for battery pack design by simplifying thermal management and allowing bipolar stacking, thereby dramatically improving the energy density beyond what would be possible for a Li-ion battery containing liquid electrolyte.

Thus, there is a need to discover a structure and chemistry which stabilizes a solid electrolyte from reduction by a lithium metal electrode and which prevents lithium dendrite shorting and thus, allows for the development of batteries which utilize the full specific capacity of the lithium metal anode. Specifically, there is a need to discover a structure and chemistry which stabilizes lithium thiophosphate type solid electrolytes to reduction by a lithium metal electrode and prevents formation of dendritic formations which project to the cathode.

Accordingly, an object of this application is to provide a lithium solid state battery having a protective additive layer or composition between the lithium or lithium alloy anode and the solid state electrolyte such as a lithium thiophosphate electrolyte—which protects the electrolyte from reductive decomposition and resists dendrite formation.

Another object s to provide a method to prepare such structure.

Another object is to provide an all-solid state lithium battery containing a lithium metal anode and a solid state electrolyte, especially a lithium thiophosphate-type electrolyte which resistant to dendrite formation.

A further object is to provide a lithium-sulfur solid state battery having good cycling stability.

SUMMARY OF THE EMBODIMENTS

These and other objects are provided by the embodiments of the present disclosure, the first embodiment of which includes composite material of formula (I):

$$(LPS)_a(MPS)_b \quad (I)$$

wherein each of a and b is a mass % value from 1% to 99% such that a+b is 100%;

(LPS) is a material selected from the group consisting of $Li_3PS_4$, $H_7P_3S_{11}$, and a material of formula (II):

$$xLi_2S.yP_2S_5.(100-x-y)LiX \quad$$

wherein X is I, Cl or Br, each of x and y is a mass % value of from 33.3% to 50% such that x+y is from 75% to 100% and the total mass % of $Li_2S$, $P_2S_5$ and LiX is 100%; and (MPS) is a material of formula (III):

$$mLi_2S.nMS.oP_2S_5.(100-m-n-o)LiX \quad (III)$$

wherein

MS is a transition metal sulfide or a semi-metal sulfide,

X is I, Cl or Br, each of m, n and o is a mass % value greater than 0 such that (m+n+o) is from 75% to 100% and the total mass % of $Li_2S$, $P_2S_5$ and LiX, is 100%.

In an aspect of the first embodiment, the M of MS is selected from the group consisting of Ag, Al, As, Bi, Cd, Ga, Ge, In, N, Pb, Pd, Pt, Rh, Ru, Sb, Se, Si, Sn, Sr, Te, Tl and Zn.

In a second embodiment, the present disclosure includes a solid-state lithium battery, comprising in the order listed:

a lithium metal or lithium alloy metal anode;
a layer of a composite material of formula (I);
a solid-state electrolyte; and
a cathode:

$$(LPS)_a(MPS)_b \quad (I)$$

wherein each of a and b is a mass % value from 1% to 99% such that a+b is 100%;

(LPS) is a material selected from the group consisting of $Li_3PS_4$, $Li_7P_3S_{11}$, $Li_7GeP_2S_{11}$, and a material of formula (II):

$$xLi_2S.yP_2S_5.(100-x-y)LiX \quad (II)$$

wherein X is I, Cl or Br, each of x and y is a mass % value of from 33.3% to 50% such that x+y is from 75% to 100% and the total mass % of $Li_2S$, $P_2S_5$ and LiX is 100%; and (MPS) is a material of formula (III):

$$mLi_2S.nMS.oP_2S_5.(100-m-n-o)LiX \quad (III)$$

wherein

MS is a trasnsition metal sulfide or a semi metal sulfide,

X is I, Cl or each of m, n and o is a mass % value greater than 0 such that (m+n+o) is from 75% to 100% and the total mass % of $Li_2S$, $P_2S_5$ and LiX is 100%.

In one aspect of the second embodiment M is an element selected from the group of elements consisting of Ag, Al, As, Bi, Cd, Ga, Ge, In, N, Pb, Pd, Pt, Rh, Ru, Sb, Se, Si, Sn, Sr, and Zn.

In another aspect of the second embodiment a thickness of the layer of the composite material of formula (I) is from 0.1 mm to 100 mm.

In another aspect of the second embodiment the solid-state electrolyte is a lithium thiophosphate selected from the group consisting of $Li_3PS_4$, $Li_7P_3S_{11}$, $Li_{10}GeP_2S_{11}$ and a material of formula (II):

$$xLi_2S.yP_2S_5.(100-x-y)LiX \quad$$

wherein X is I, Cl or Br, each of x and y is a mass % value of from 33.3% to 50% such that x+y is from 75% to 100% and the total mass % of $Li_2S$, $P_2S_5$ and LiX is 100%.

In a further aspect of the second embodiment the cathode comprises a lithium metal oxide selected from the group consisting of lithium cobalt oxide ($LiCoO_2$), lithium manganese oxide ($LiMn_2O_4$), lithium iron phosphate ($LiFePO_4$) and lithium nickel manganese cobalt oxide.

In another further aspect of the second embodiment the cathode comprises elemental sulfur, selenium, tellurium or a mixture of two or more of these.

In a third embodiment, the present disclosure includes a solid-state lithium-sulfur battery, comprising in the order listed:

an anode comprising lithium metal as an active material;
a layer of a composite material of formula (I);
a solid-state electrolyte; and
a cathode comprising elemental sulfur as an active material:

$$(LPS)_a(MPS)_b \quad (I)$$

wherein each of a and b is a mass % value from 1% to 99% such that a+b is 100%;

(LPS) is a material selected from the group consisting of $Li_3PS_4$, $Li_{10}GeP_2S_{11}$, and a material of formula (II):

$$xLi_2S.yP_2S_5.(100-x-y)LiX \quad (II)$$

wherein X is I, Cl or Br, each of x and y is a mass % value of from 33.3% to 50% such that x+y is from 75% to 100% and the total mass % of $Li_2S$, $P_2S_5$, and LiX is 100%; and (MPS) is a material of formula (III):

$$mLi_2S.nMS.oP_2S_5.(100-m-n-o)LiX \quad (III)$$

wherein

MS is a trasnsition metal sulfide or a semi metal sulfide,

X is I, Cl or Br, each of m, n and o is a mass % value greater than 0 such that (m+n+o) is from 75% to 100% and the total mass % of Li$_2$S, P$_2$S$_5$ and LiX is 100%.

In one aspect of the third embodiment the solid state electrolyte is selected from the group consisting of Li$_3$PS$_4$, Li$_7$P$_3$S$_{11}$, Li$_{10}$GeP$_2$S$_{11}$ and a material of formula (II):

$$x\text{Li}_2\text{S}.y\text{P}_2\text{S}_5.(100-x-y)\text{LiX} \qquad \text{(II)}$$

wherein X is I, Cl or Br, each of x and y is a mass % value of from 33.3% to 50% such that x+y is from 75% to 100% and the total mass % of Li$_2$S, P$_2$S$_5$ and LiX is 100%

In a further aspect of the third embodiment M is an element selected from the group of elements consisting of Ag, Al, As, Bi, Cd, Ga, Ge, In, N, Pb, Pd, Pt, Rh, Ru, Sb, Se, Si, Sn, Sr, Te, Tl and Zn.

In another aspect of the third embodiment a thickness of the interphase region is from 0.1 to 100 mm.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

FIG. 1A shows a schematic diagram of the first stage of cell assembly and design for testing solid electrolytes without an intermediate additive layer between the anode and solid electrolyte.

FIG. 1B shows a schematic diagram of the second stage of cell assembly and design for testing solid electrolytes without an intermediate additive layer between the anode and solid electrolyte.

FIG. 4B also shows an electron dispersive X-ray spectroscopy (EDS) showing the distribution of Ag in the material.

DESCRIPTION OF THE PREFERRED EMBODIMENTS

Throughout this description, the terms "electrochemical cell" and "battery" may be employed interchangeably unless the context of the description clearly distinguishes an electrochemical cell from a battery. Further the terms "solid-state electrolyte" and "solid-state ion conductor" may be employed interchangeably unless explicitly specified differently. The term "approximately" when associated with a numerical value conveys a range from −10% of the base value to 10% of the base value.

As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The terms "additive layer," "additive electrolyte layer" and "layer of composite material of formula (I) may be used interchangeably and are to be considered descriptive of the same element of the present disclosure.

In consideration of the electrolyte reductive decomposition when in contact with lithium metal described previously, the inventors have surprisingly discovered that inserting an additive electrolyte layer of formula (I) between the lithium anode and solid electrolyte, decomposition of the solid electrolyte is reduced and dendritic growth is impeded. Therefore, the cycle life stability of the lithium metal solid state battery is enhanced.

Figure 6:
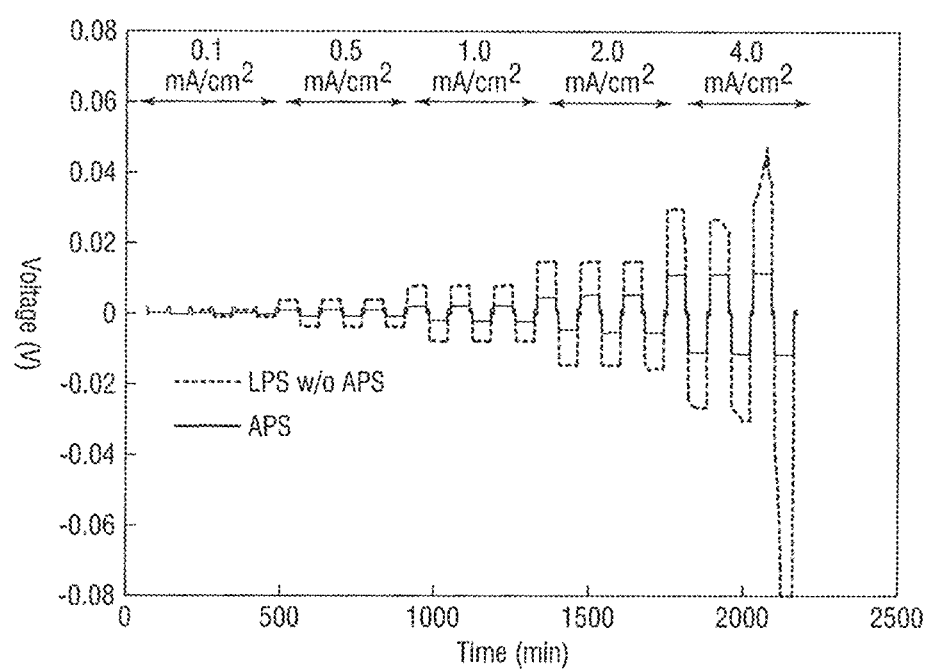
FIG. 6 shows the CCD of a solid-electrolyte layer according to an embodiment of the present disclosure and of a conventional solid electrolyte.
Figure 7A:
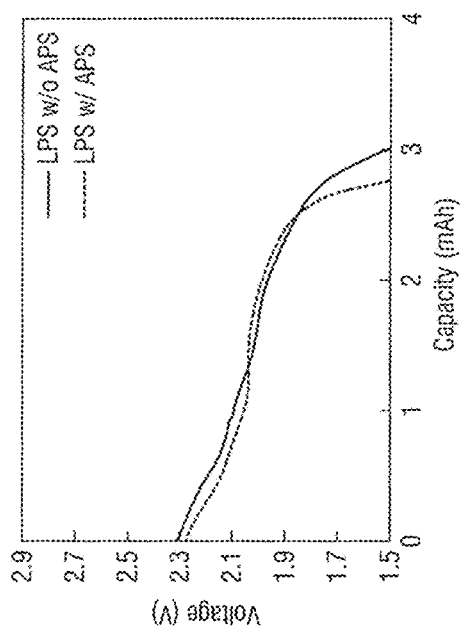
FIG. 7A shows the 1$^{st}$ galvanic discharge of a battery having sulfur cathode with a solid-electrolyte structure according to an embodiment of the present disclosure and of a conventional solid electrolyte.
Figure 7B:
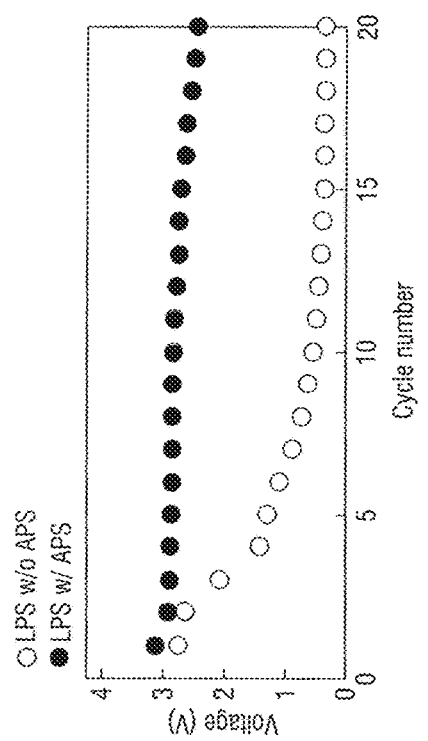
FIG. 7B shows the Discharge capacity with cycling at a 1 C rate (4.56 mA/cm$^2$) for a battery having sulfur cathode with a solid-electrolyte structure according to an embodiment of the present disclosure and of a conventional solid electrolyte.

The surprising improvement in performance is demonstrated with the composite material prepared and tested in Example 1 and demonstrated in FIGS. 6, 7A and 7B wherein the long-term cycling performance of a battery containing the additive layer between the anode and solid electrolyte according to embodiments of the present disclosure was shown to be significantly more stable than a conventional battery not containing a layer of composite material of formula (I).

Thus in a first embodiment the present disclosure provides a composite material of formula (I):

$$(\text{LPS})_a(\text{MPS})_b \qquad \text{(I)}$$

wherein each of a and b is a mass % value from 1% to 99% such that a+b is 100%. According to the present disclosure (LPS) is a material selected from the group consisting of Li$_3$PS$_4$, Li$_7$P$_3$S$_{11}$, Li$_{10}$GeP$_2$S$_{11}$, and a material of formula (II):

$$x\text{Li}_2\text{S}.y\text{P}_2\text{S}_5.(100-x-y)\text{LiX} \qquad \text{(II)}$$

wherein X is I, Cl or Br, each of x and y is a mass % value of from 33.3% to 50% such that x+y is from 75% to 100% and the total mass % of Li$_2$S, P$_2$S$_5$ and LiX is 100%; and (MPS) is a material of formula (III):

$$m\text{Li}_2\text{S}.n\text{MS}.o\text{P}_2\text{S}_5.(100-m-n-o)\text{LiX} \qquad \text{(III)}$$

wherein MS is a trasnsition metal sulfide or a semi metal sulfide, X is I, Cl or Br, each of m, n and o is a mass % value greater than 0 such that (m+n+o) is from 75% to 100% and the total mass % of $Li_2S$, $P_2S_5$ and LiX is 100%.

Although not limited to, preferred elements suitable as M include one or more selected from Ag, Al, As, Bi, Cd, Ga, Ge, In, N, Pb, Pd, Pt, Rh, Ru, Sb, Se, Si, Sn, Sr, Te, Tl and Zn.

As described in the examples, the inventors have surprisingly discovered that a distinct composite material may be obtained when materials according to (LPS) are mixed with materials according to MPS. Thus as described in Example 1 Lithium sulfide, phosphorous pentasulfide, LiX (X=Cl, I, and Br) may be combined in a mortar according to the weight % ranges described above. These components may be mixed for a time of from 10 min to 1 h in the mortar and then the resulting powder may be ball milled for a time of from 1 to 7 days to obtain the (LPS) electrolyte component. Although not considered necessary the electrolyte component may be annealed at 180° C. for up to 3 hours.

Secondly, a (MPS) electrolyte component, designated as APS in the example was prepared by mixing silver sulfide ($Ag_2S$), phosphorous pentasulfide ($P_2S_5$) and LiX (X=Cl, I, and Br) according to the weight % ranges described above in a mortar. These components may be mixed anywhere from 10 min to 1 h in the mortar and then the resulting powder was ball milled for from 1 to 7 days to obtain the APS material (MPS).

The LPS and APS hand-milled together in a mortor and pestle for from 10 min to 1 h to obtain a composite material of formula (I) where M is Ag.

Figure 3:
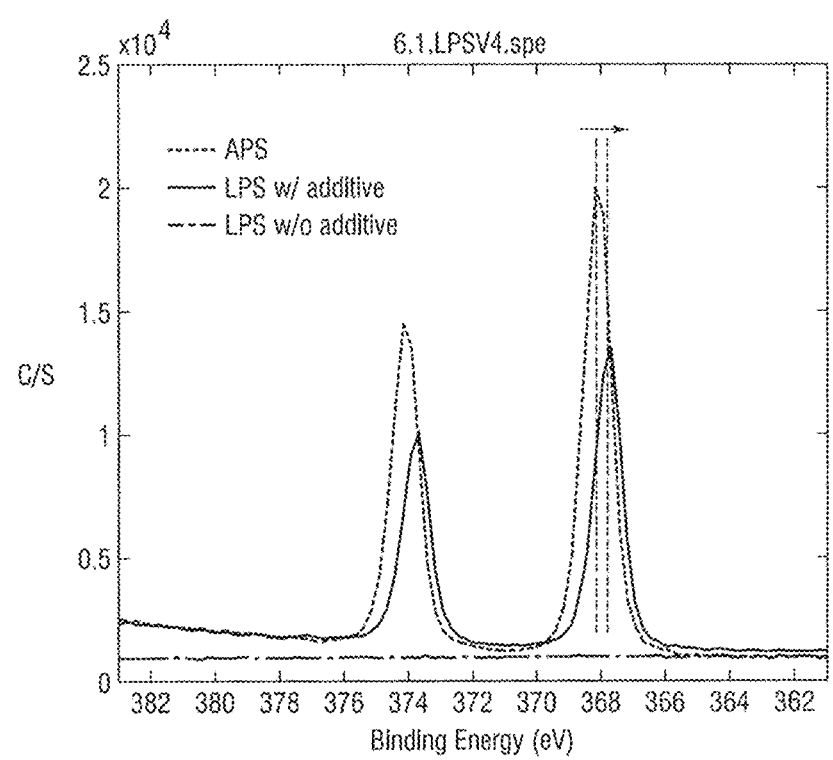
FIG. 3 shows the X-ray photoelectron spectroscopy (XPS) of the composite material according to one embodiment obtained in Example 1.

FIG. 3 shows the X-ray photoelectron spectra (XPS) of the LPS electrolyte material, the APS electrolyte material and the composite material obtained and identified according to formula I (M=Ag). The formation of a distinct new composite material of formula (I) as a new species is evidenced by the shift of Ag 3d peak shown in FIG. 3 when the APS and LPS are mixed.

Figure 4A:
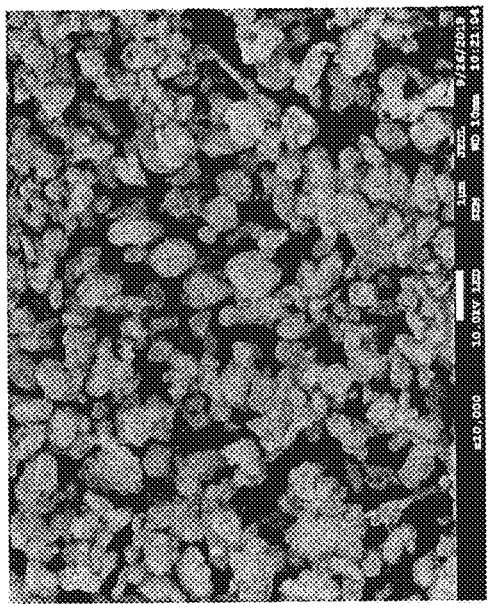
FIG. 4A shows the Scanning Electron Microscope (SEM) image of LPS.
Figure 4B:
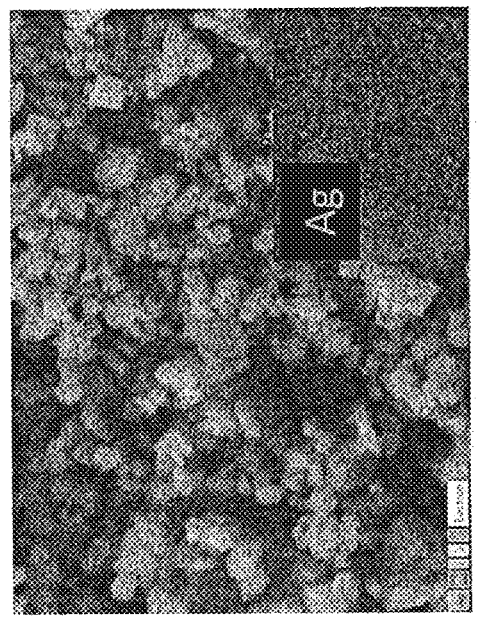
FIG. 4B shows the SEM image of a composite material of formula (I) according to an embodiment of the present disclosure.
Figure 4C:
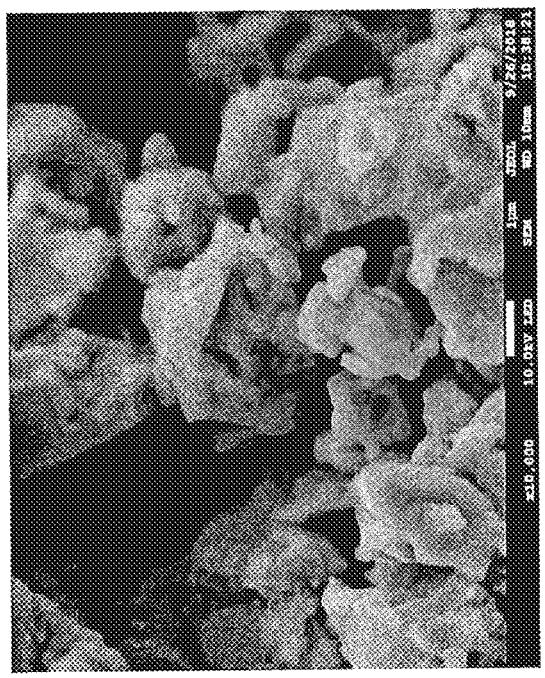
FIG. 4C shows the SEM image of APS.

FIG. 4A shows the scanning electron microscope image of the LPS. FIG. 4C shows the scanning electron microscope image of the APS, and FIG. 4B shows the scanning electron microscope image of the new composite species. FIG. 4B also shows an electron dispersive X-ray spectroscopy (EDS) image which shows a uniform distribution of Ag throughout the composite and supports the formation of a distinct new material according to formula (I).

Figure 5:
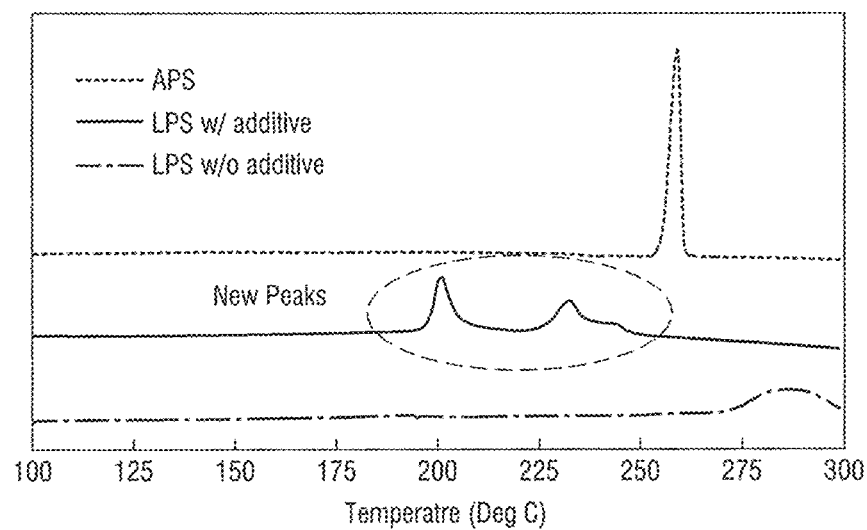
FIG. 5 shows Differential Scanning calorimetry (DSC) scans for IPS, APS and a composition according to an embodiment of the present disclosure.

FIG. 5 shows superimposed Differential Scanning calorimetry (DSC) curves for each of LPS, APS and the composite material of formula (I). The distinct new crystallization peaks observed in the DSC curve of the formula (I) composite also indicates this composite material is different from a simple mechanical mixture of the LPS and the APS.

Figures 2A, 2B, 2C:
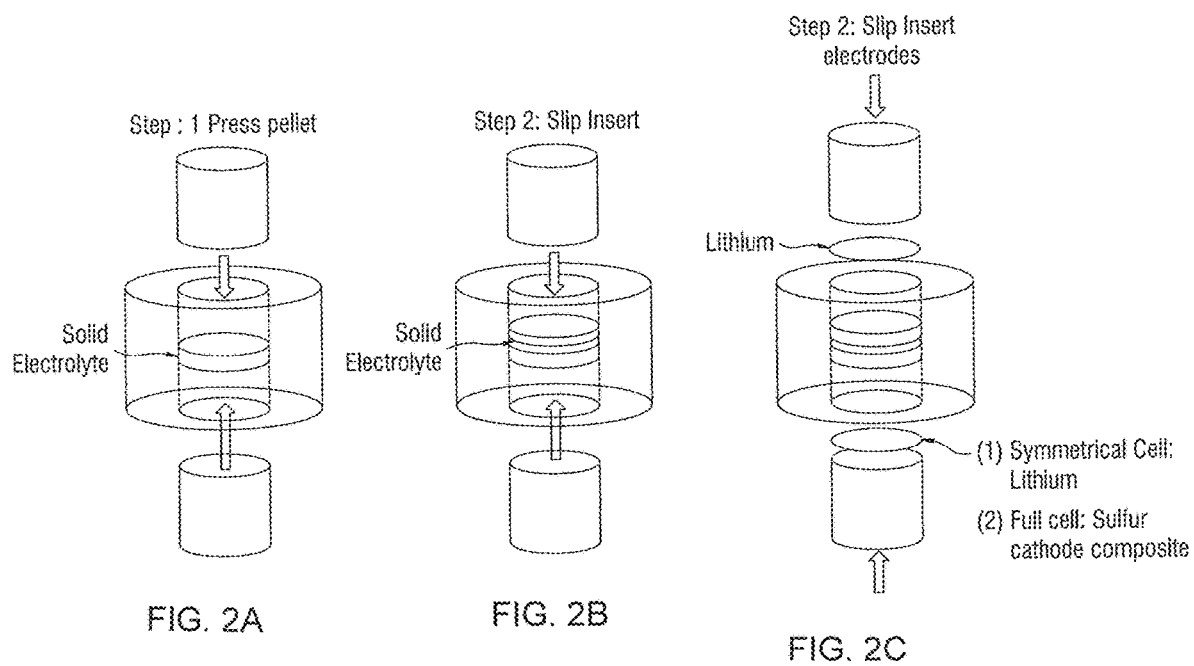
FIG. 2A shows a schematic diagram of the first stage of cell assembly and design according to an embodiment of the present disclosure.
FIG. 2B shows a schematic diagram of the second stage of cell assembly according to an embodiment of the present disclosure.
FIG. 2C shows a schematic diagram of the third stage of cell assembly according to an embodiment of the present disclosure.

As schematically diagrammed in FIG. 2B a symmetric test cell was prepared by insertion of the additive layer of the composite material of formula (I) [(LPS)(APS)] between a lithium metal anode and a solid electrolyte. Dendrites are formed according to the equation;

$$Li^- + e^- \rightarrow Li\text{-metal}_{dendrite}.$$

Although not wishing to be confined by theory the inventors believe the additive layer functions to react with a forming dendrite at a contact point during the cycling of the cell. By such reaction the dendrite is stopped from penetrating to the cathode layer and thus no electrical short forms. One proof of the performance and validity of the additive layer is a Critical Current Density (CCD) test performed in the lithium-lithium symmetrical cell. According to the CCD test the current density (mA/cm²) is gradually increased and the voltage is measured. The current should be flat and stable according to the equation V=IR. When the voltage shows an increase at a constant current, a dendrite has penetrated the solid electrolyte. The current density at the voltage increase is known as the CCD. FIG. 6 shows the CCD of the cell containing a solid-electrolyte layer and additive layer of formula (I) in comparison to a symmetric cell prepared according to FIG. 1B without the intermediate additive layer of formula (I). As indicated in FIG. 6 the CCD of the standard cell is without additive layer is 4 mA/cm² while the cell containing the additive layer of formula (I) shows a significant increase in CCD.

Lithium-sulfur cells were prepared according to to FIGS. 1A and 1B (no composite additive layer) and 2A-2C (with composite additive layer) and tested as full cells as shown in FIGS. 7A and 7B. FIG. 7A is the 1$^{st}$ galvanic discharge and FIG. 7B is the Discharge capacity with cycling at a 1 C rate (4.56 mA/cm²). Two consequences of an electrical short for a full cell battery are (i) a decrease in discharge voltage and (ii) a decrease in discharge capacity. Neither (i) nor (ii) are observed for the Li—S cell containing the additive layer of formula (I) between the anode and the solid electrolyte.

Thus in a second embodiment, the present disclosure provides a solid-state lithium battery, comprising in the order listed: a lithium metal or lithium alloy metal anode; a layer of a composite material of formula (I); a solid-state electrolyte; and a cathode.

$$(LPS)_a(MPS)_b \qquad (I)$$

In formula (I) each of a and b is a mass % value from 1% to 99% such that a+b is 100%. (LPS) is a lithium thiophosphate material selected from the group consisting of $Li_3PS_4$, $Li_7P_3S_{11}$, $Li_{10}GeP_2S_{11}$, and a material of formula (II):

$$xLi_2S \cdot yP_2S_5 \cdot (100-x-y)LiX$$

wherein X is I, Cl or Br, each of x and y is a mass % value of from 33.3% to 50% such that x+y is from 75% to 100% and the total mass % of $Li_2S$, $P_2S_5$ and LiX is 100%.

(MPS) is a material of formula (III):

$$mLi_2S \cdot nMS \cdot oP_2S_5 \cdot (100-m-n-o)LiX$$

wherein MS is a trasnsition metal sulfide or a semi metal sulfide, X is I, Cl or Br, each of m, n and o is a mass % value greater than 0 such that (m+n+o) is from 75% to 100% and the total mass % of $Li_2S$, MS, $P_2S_5$ and LiX is 100%.

The anode comprised a current collector; and an electrode active layer on the current collector; wherein the electrode active layer comprises lithium metal or a lithium metal alloy. The current collector may be any conductive metal or conductive polymer conventionally employed as current collector components.

In a preferred aspect the metal or semi-metal M may be selected from the group of elements consisting of Ag, Al, As, Bi, Cd, Ga, Ge, In, N, Pb, Pd, Pt, Rh, Ru, Sb, Se, Si, Sn, Sr, Te, Tl and Zn.

The thickness of the additive layer of formula (I) is not limited, but generally, may vary from 0.1 to 100 mm, preferably, 1 to 50 mm and most preferably 2-25 nm.

The solid electrolyte may be of any composition known in the art and may be any previously described. In a preferred aspect of the second embodiment, the electrolyte may be a lithium thiophosphate selected from the group consisting of $Li_3PS_4$, $Li_7P_3S_{11}$, $Li_{10}GeP_2S_{11}$ and a material of formula (II):

$$xLi_2S \cdot yP_7S_5 \cdot (100-x-y)LiX \qquad (II)$$

wherein X is I, Cl or Br, each of x and y is a mass % value of from 33.3% to 50% such that x+y is from 75% to 100% and the total mass % of $Li_2S$, $P_2S_5$ and LiX is 100%. Synthesis of such composite materials is described in U.S. application Ser. No. 16/043,944, filed Jul. 24, 2018, the disclosure of which is incorporated herein by reference.

Additionally, the lithium thiophosphate solid electrolyte may be doped with lithium salts such as LiI, LiBr, LiCl, $Li_3N$, $Li_3P$, LiPON, $Li_2O$, $Li_3BO_3$, or $LiBH_4$.

The cathode may be any conventionally employed in lithium ion batteries, including but not limited to composite lithium metal oxides such as, for example, lithium cobalt oxide ($LiCoO_2$), lithium manganese oxide ($LiMn_2O_4$), lithium iron phosphate ($LiFePO_4$) and lithium nickel manganese cobalt oxide. Other ac cathode materials may also include elemental sulfur, other chalcogenides, such as selenium and tellurium and metal sulfide composites. The cathode may be constructed according to methods conventionally known in the art and may include conductive carbon and a binder. The cathode may also include current collector such as copper, aluminum and stainless steel.

In one special aspect, the active cathode material may comprise elemental sulfur as the basic active ingredient. Conventionally known additives such as binders and conductive carbon materials may be included.

In a third embodiment, the present disclosure provides solid-state lithium-sulfur battery, comprising in the order listed: an anode comprising lithium metal as an active material; a layer of a composite material of formula (I); a solid-state electrolyte; and a cathode comprising elemental sulfur as an active material:

$$(LPs)_a(MPS)_b \quad (I)$$

wherein
each of a and b is a mass % value from 1% to 99% such that a+b is 100%.

(LPS) is a material selected from the group consisting of $Li_3PS_4$, $Li_7P_3S_{11}$, $Li_{10}GeP_2S_{11}$, and a material of formula (II):

$$xLi_2S.yP_2S_5.(100-x-y)LiX \quad (II)$$

wherein X is I, Cl or Br, each of x and y is a mass % value of from 33.3% to 50% such that x+y is from 75% to 100% and the total mass % of $Li_2S$, $P_2S_5$ and LiX is 100%.

(MPS) is a material of formula (III):

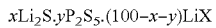
$$mLi_2S.nMS.oP_2S_5.(100-m-n-o)LiX \quad (III)$$

wherein MS is a trasnsition metal sulfide or a semi metal sulfide, X is I, Cl or Br, each of m, n and o is a mass % value greater than 0 such that (m+n+o) is from 75% to 100% and the total mass % of $Li_2S$, $P_2S_5$ and LiX is 100%.

The solid electrolyte may be of any composition known in the art to be compatible in a. Li—S battery and may be any previously described. In a preferred aspect of the third embodiment, the electrolyte may be a lithium thiophosphate selected from the group consisting of $Li_3PS_4$, $Li_7P_3S_{11}$, $Li_{10}GeP_2S_{11}$ and a material of formula (II):

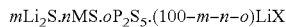
$$xLi_2S.yP_2S_5.(100-x-y)LiX \quad (II)$$

wherein X is I, Cl or Br, each of x and y is a mass % value of from 33.3% to 50% such that x+y is from 75% to 100% and the total mass % of $Li_2S$, $P_2S_5$ and LiX is 100%.

In one aspect of the third embodiment M is an element selected from the group of elements consisting of Ag, Al, As, Bi, Cd, Ga, Ge, in, N, Pb, Pd, Pt, Rh, Ru, Sb, Se, Si, Sn, Sr, Te, Tl and Zn.

The thickness of the additive layer of formula (I) is not limited, but generally, may vary from 0.1 to 100 mm, preferably, 1 to 50 mm and most preferably 2-25 nm.

EXAMPLES

Example 1—$Li_xAg_{(1-x)}P_yS_z$ Synthesis

Lithium Thiophosphate Synthesis:
Lithium sulfide, x wt % of $Li_2S$, phosphorous pentasulfide, y wt % $P_2S_5$, and z wt % LiX (X=Cl, I, and Br) wherein x=50-75 wt %, y=25-40% and z=0-25 wt % were combined in a mortar according to the weight % ranges listed. These components were mixed anywhere from 10 min to 1 h in the mortar and then the powder was ball milled for 1-7 days. The electrolyte may be annealed at 180° C. for up to 3 hours but the annealing is not consudered necessary. This electrolyte material is referenced as LPS.

Silver Thiophosphate Synthesis:
Silver sulfide, m wt % of $Ag_2S$, phosphorous pentasulfide, n wt % $P_2S_5$, and o wt % LiX (X=Cl, I, and Br) wherein m=50-75 wt %, n=25-40% and o=0-25 wt % were combined in a mortar according to the weight % ranges listed. These components were mixed anywhere from from 10 min to 1 h in the mortar and then the powder was ball milled for 1-7 days. This electrolyte material is referenced as APS.

$Li_xAg_{(1-x)}P_yS_z$ Synthesis:
1-99 wt % LPS and 1-99 wt % APS in a mortor and pestle.  The electrolyte was formed by hand-milling from 10 min to 1 h. No additional steps were needed to form the electrolyte in powder form.

FIG. 3 shows the X-ray photoelectron spectra (XPS) of the LPS electrolyte material, the APS electrolyte material and the material identified as $Li_xAg_{(1-x)}P_yS_z$. The formation of $Li_xAg_{(1-x)}P_yS_z$ as a new species is evidenced through the shift of Ag 3d peak shown in FIG. 3 when APS is mixed with LPS.

FIG. 4A shows the scanning electron microscope image of the LPS. FIG. 4C shows the scanning electron microscope image of the APS, and FIG. 4B shows the scanning electron microscope image of the $Li_xAg_{(1-x)}P_yS_z$. FIG. 4B also shows an electron dispersive X-ray spectro (EDS) image which projects a uniform distribution of Ag indicative of the formation of $Li_xAg_{(1-x)}P_yS_z$.

FIG. 5 shows superimposed Differential Scanning calorimetry (DSC) curves for each of LPS, APS and $Li_xAg_{(1-x)}P_yS_z$. The distinct new crystallization peaks observed in the $Li_xAg_{(1-x)}P_yS_z$ indicates this is different from either starting material LPS and APS.

A solid electrolyte additive layer was formed from this powder electrolyte by pressing the electrolyte powder from 0.5 to 10 tons/cm² pressure.

The electrolyte additive layer was placed on top of the anode layer as shown in FIG. 2B and a cell according to FIGS. 2A-2C prepared.

The following tests were performed to prove the validity of the additive layer:
(1) Critical Current Density (CCD) test—Performed in a lithium-lithium symmetrical cell.
(2) Cell testing Performed in a full battery cell.

CCD Test—

Each of a lithium-lithium symmetrical cell containing a LPS electrolyte and a lithium-lithium cell containing the $Li_xAg_{(1-x)}P_yS_z$ additive electrolyte was tested by gradually increasing the current density (mA/cm²) and measuring the corresponding voltage. The current should be flat and stable according to the equation V=IR. Thus, an increase in voltage with application of a constant current was indicative that a dendrite had penetrated the solid electrolyte. The current density at which the voltage increase occurred was identified as the critical current density (CCD). FIG. 6 shows the voltage vs. current for both symmetrical cells. As indicated the cell with the $Li_xAg_{(1-x)}P_yS_z$ additive electrolyte according to the present disclosure withstands current as high as 4.0 mA/cm².

Full Cell Testing—

Each of a lithium-sulfur cell containing a LPS electrolyte and a lithium-sulfur cell containing the $Li_xAg_{(1-x)}P_yS_z$ additive electrolyte was tested by cycling at a 1 C rate (4.56 mA/cm²), 1 C=Full discharge in 1 hour. The capacity and voltage of the battery was monitored for dendrite penetration based on (i) a decrease in discharge voltage and/or (ii) a decrease in discharge capacity.

FIG. 7A shows the 1$^{st}$ galvanic discharge of a sulfur cathode with and without additive layer. FIG. 7B is the Discharge capacity with cycling at a 1 C rate (4.56 mA/cm²). As indicated, for the cell containing the electrolyte according to the present disclosure neither a decrease in discharge voltage nor a decrease in discharge capacity was observed.

Example 2—Symmetric Lithium Cell
[Lithium/Solid Electrolyte/Lithium]

A symmetric lithium/solid electrolyte/lithium cell was fabricated according to the schematic diagram of FIGS. 1A-1B.

A symmetric lithium/additive solid electrolyte/lithium cell was fabricated according to the schematic diagram of FIGS. 2A-2C.

In each cell, first, 80 to 300 mg of lithium halide-doped lithium thiophosphate, or alternatively, the new electrolyte additive $Li_xAg_{(1-x)}P_yS_z$, was cold-pressed into a 1.128 cm diameter pellet using 0.5 to 10 tons of pressure. Lithium metal disks were gently pressed against both sides of the solid electrolyte pellet to complete the symmetric cell.

Example 3—Lithium-Sulfur Solid Electrolyte Cell
[Lithium/Solid Electrolyte/Sulfur]

A lithium/solid electrolyte/sulfur cell was fabricated according to the schematic diagram of FIGS. 1A-1B.

A lithium/additive solid electrolyte/sulfur cell was fabricated according to the schematic diagram of FIGS. 2A-2C.

In each cell, first, 80 to 300 mg of lithium halide-doped lithium thiophosphate or alternatively, the new electrolyte additive $Li_xAg_{(1-x)}P_yS_z$, was cold-pressed into a 1.128 cm diameter pellet using 0.5 to 10 tons of pressure. Then, 1 to 300 mg of a mixture of sulfur, carbon and lithium halide-doped lithium thiophosphate was spread atop the solid electrolyte pellet and the stack was pressed again with 0.1 to 6 tons of pressure. Finally, lithium foil was placed against the opposing side of the solid electrolyte, followed by copper foil to act as a current collector, and the stack was pressed at 0 to 4 tons of pressure.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A composite material of formula (I):

$$(LPS)_a(MPS)_b \quad (I)$$

wherein
each of a and b is a mass % value from 1% to 99% such that a+b is 100%;
(LPS) is a material selected from the group consisting of $Li_3PS_4$, $Li_7P_3S_{11}$, $Li_{10}GeP_2S_{11}$, and a material of formula (II):

$$xLi_2S.yP_2S_5.(100-x-y)LiX \quad (II)$$

wherein X is I, Cl or Br, each of x and y is a mass % value of from 33.3% to 50% such that x+y is from 75% to 100% and the total mass % of $Li_2S$, $P_2S_5$ and LiX is 100%; and
(MPS) is a material of formula (III):

$$mLi_2S.nMS.oP_2S_5.(100-m-n-o)LiX \quad (III)$$

wherein
MS is a transition metal sulfide,
with the proviso that zinc is not included,
X is I, Cl or Br,
each of m, n and o is a mass % value greater than 0 such that (m+n+o) is from 75% to 100% and the total mass % of $Li_2S$, $P_2S_5$ and LiX is 100%.

2. The composite material of claim 1 wherein M of MS is selected from the group consisting of Ag, Cd, Pd, Pt, Rh, Ru.

3. A solid-state lithium battery, comprising in the order listed:
a lithium metal or lithium alloy metal anode;
a layer of a composite material of formula (I);
a solid-state electrolyte; and
a cathode:

$$(LPS)_a(MPS)_b \quad (I)$$

wherein
each of a and b is a mass % value from 1% to 99% such that a+b is 100%;
(LPS) is a material selected from the group consisting of $Li_3PS_4$, $Li_7P_3S_{11}$, $Li_{10}GeP_2S_{11}$, and a material of formula (II):

$$xLi_2S.yP_2S_5.(100-x-y)LiX \quad (II)$$

wherein X is I, Cl or Br, each of x and y is a mass % value of from 33.3% to 50% such that x+y is from 75% to 100% and the total mass % of $Li_2S$, $P_2S_5$ and LiX is 100%; and
(MPS) is a material of formula (III):

$$mLi_2S.nMS.oP_2S_5.(100-m-n-o)LiX \quad (III)$$

wherein
MS is a transition metal sulfide,
with the proviso that zinc is not included,
X is I, Cl or Br,
each of m, n and o is a mass % value greater than 0 such that (m+n+o) is from 75% to 100% and the total mass % of $Li_2S$, $P_2S_5$ and LiX is 100%.

4. The solid-state lithium battery according to claim 3, wherein M is an element selected from the group of elements consisting of Ag, Cd, Pd, Pt, Rh, Ru.

5. The solid-state lithium battery according to claim 3, wherein a thickness of the layer of the composite material of formula (I) is from 0.1 mm to 100 mm.

6. The solid-state lithium battery according to claim 3, wherein the solid-state electrolyte is a lithium thiophosphate selected from the group consisting of $Li_3PS_4$, $Li_7P_3S_{11}$, $Li_{10}GeP_2S_{11}$ and a material of formula (II):

$$xLi_2S.yP_2S_5.(100-x-y)LiX$$

wherein X is I, Cl or Br, each of x and y is a mass % value of from 33.3% to 50% such that x+y is from 75% to 100% and the total mass % of $Li_2S$, $P_2S_5$ and LiX is 100%.

7. The solid-state lithium battery according to claim 3, wherein the cathode comprises a lithium metal oxide selected from the group consisting of lithium cobalt oxide ($LiCoO_2$), lithium manganese oxide ($LiMn_2O_4$), lithium iron phosphate ($LiFePO_4$) and lithium nickel manganese cobalt oxide.

8. The solid-state lithium battery according to claim 3, wherein the cathode comprises elemental sulfur, selenium, tellurium or a mixture of two or more of these.

9. A solid-state lithium battery, comprising in the order listed:
an anode comprising lithium metal as an active material;
a layer of a composite material of formula (I);
a solid-state electrolyte; and
a cathode comprising elemental sulfur as an active material:

$$(LPS)_a(MPS)_b \quad (I)$$

wherein
each of a and b is a mass % value from 1% to 99% such that a+b is 100%;
(LPS) is a material selected from the group consisting of $Li_3PS_4$, $Li_7P_3S_{11}$, $Li_{10}GeP_2S_{11}$, and a material of formula (II):

$$xLi_2S.yP_2S_5.(100-x-y)LiX \quad (II)$$

wherein X is I, Cl or Br, each of x and y is a mass % value of from 33.3% to 50% such that x+y is from 75% to 100% and the total mass % of $Li_2S$, $P_2S_5$ and LiX is 100%; and (MPS) is a material of formula (III):

$$mLi_2S.nMS.oP_2S_5.(100-m-n-o)LiX \quad (III)$$

wherein
MS is a transition metal sulfide,
with the proviso that zinc is not included,
X is I, Cl or Br,
each of m, n and o is a mass % value greater than 0 such that (m+n+o) is from 75% to 100% and the total mass % of $Li_2S$, $P_2S_5$ and LiX is 100%.

10. The solid-state lithium battery according to claim 9, wherein the solid state electrolyte is selected from the group consisting of $Li_3PS_4$, $Li_7P_3S_{11}$, $Li_{10}GeP_2S_{11}$, and a material of formula (II):

$$xLi_2S.yP_2S_5.(100-x-y)LiX$$

wherein X is I, Cl or Br, each of x and y is a mass % value of from 33.3% to 50% such that x+y is from 75% to 100% and the total mass % of $Li_2S$, $P_2S_5$ and LiX is 100%.

11. The solid-state lithium battery according to claim 9, wherein M is an element selected from the group of elements consisting of Ag, Cd, Pd, Pt, Rh, Ru.

12. The solid-state lithium battery according to claim 9, wherein a thickness of the layer of the composite material of formula (I) is from 0.1 mm to 100 mm.

* * * * *